US008280368B2

(12) United States Patent
Mantravadi et al.

(10) Patent No.: US 8,280,368 B2
(45) Date of Patent: Oct. 2, 2012

(54) METHOD AND SYSTEM FOR RE-ACQUIRING SIGNALS OF A WIRELESS BROADCAST NETWORK

(75) Inventors: Ashok Mantravadi, San Diego, CA (US); Dhinakar Radhakrishnan, San Diego, CA (US); Murali Ramaswamy Chari, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 917 days.

(21) Appl. No.: 11/398,202

(22) Filed: Apr. 4, 2006

(65) Prior Publication Data
US 2006/0252420 A1 Nov. 9, 2006

Related U.S. Application Data

(60) Provisional application No. 60/669,554, filed on Apr. 7, 2005.

(51) Int. Cl.
H04W 24/00 (2009.01)

(52) U.S. Cl. ............ 455/423; 455/67.11; 455/502; 455/3.05; 455/422.1; 370/338; 370/312; 370/350; 370/347

(58) Field of Classification Search .......... 370/312, 370/331, 338, 350; 455/3.05, 502, 517, 423–425, 455/67.11, 41.2
See application file for complete search history.

(56) References Cited

U.S. PATENT DOCUMENTS

| | | | | |
|---|---|---|---|---|
| 5,363,375 A * | 11/1994 | Chuang et al. | ............ | 370/332 |
| 5,613,211 A * | 3/1997 | Matsuno | ............ | 455/502 |
| 5,852,775 A | 12/1998 | Hidary | | |
| 5,974,034 A * | 10/1999 | Chin et al. | ............ | 370/328 |
| 6,219,564 B1 * | 4/2001 | Grayson et al. | ............ | 455/574 |
| 6,256,508 B1 * | 7/2001 | Nakagawa et al. | ............ | 370/312 |
| 6,314,163 B1 * | 11/2001 | Acampora | ............ | 379/56.2 |
| 6,415,133 B1 * | 7/2002 | Brede et al. | ............ | 455/3.05 |
| 6,493,539 B1 * | 12/2002 | Falco et al. | ............ | 455/67.11 |
| 6,594,498 B1 * | 7/2003 | McKenna et al. | ............ | 455/517 |
| 6,622,022 B1 * | 9/2003 | Du | ............ | 455/502 |
| 6,675,022 B2 * | 1/2004 | Burgan et al. | ............ | 455/524 |
| 6,788,933 B2 * | 9/2004 | Boehmke et al. | ............ | 455/423 |
| 6,826,409 B2 * | 11/2004 | Kostic et al. | ............ | 455/501 |
| 7,146,133 B2 * | 12/2006 | Bahl et al. | ............ | 455/63.1 |
| 7,190,307 B2 * | 3/2007 | Gronemeyer | ............ | 342/357.15 |
| 7,349,691 B2 * | 3/2008 | Karr et al. | ............ | 455/422.1 |

(Continued)

FOREIGN PATENT DOCUMENTS

EP 0955737 A2 11/1999

(Continued)

OTHER PUBLICATIONS

International Search Report and Written Opinion - PCT/US2006/012826, International Search Authority - European Patent Office - Aug. 11, 2006 (050246).

*Primary Examiner* — Sharad Rampuria
(74) *Attorney, Agent, or Firm* — Ryan Farr

(57) ABSTRACT

The disclosure is directed to a mobile communication device that determines when a performance disruption indicates a loss of synchronization with a broadcast signal and, in response, initiates reacquisition of the signal. Reacquisition techniques may include identifying and decoding only select portions of header information in the broadcast signal. Reacquisition may also be initiated in response to one or more deterministic triggers and during a test mode of operation.

82 Claims, 7 Drawing Sheets

U.S. PATENT DOCUMENTS

| | | | |
|---|---|---|---|
| 7,397,785 B2 * | 7/2008 | Wu et al. | 370/350 |
| 7,499,438 B2 * | 3/2009 | Hinman et al. | 370/338 |
| 7,519,033 B2 * | 4/2009 | Soomro | 370/338 |
| 7,660,275 B2 * | 2/2010 | Vijayan et al. | 370/312 |
| 7,941,166 B2 * | 5/2011 | Costa et al. | 455/502 |
| 8,086,249 B1 * | 12/2011 | Dinan et al. | 455/456.1 |
| 8,185,058 B2 * | 5/2012 | Capretta et al. | 455/67.13 |
| 2002/0141371 A1 | 10/2002 | Hsu | |
| 2002/0141447 A1 | 10/2002 | Leung et al. | |
| 2004/0100937 A1 | 5/2004 | Chen | |
| 2004/0199937 A1 | 10/2004 | Langbecker et al. | |
| 2005/0122928 A1 * | 6/2005 | Vijayan et al. | 370/312 |
| 2006/0280140 A9 * | 12/2006 | Mahany et al. | 370/329 |
| 2007/0232251 A1 * | 10/2007 | Murthy et al. | 455/160.1 |

FOREIGN PATENT DOCUMENTS

| | | |
|---|---|---|
| JP | 2003045314 | 2/2003 |
| JP | 2004135293 | 4/2004 |
| JP | 2004533746 | 11/2004 |
| JP | 2007519304 | 7/2007 |
| KR | 1020030088048 | 11/2003 |
| KR | 1020030088049 | 11/2003 |
| RU | 2192095 | 10/2002 |
| WO | 02/15611 A | 2/2002 |
| WO | WO 04049617 | 6/2004 |
| WO | 2005/022811 A | 3/2005 |
| WO | 2005043829 | 5/2005 |

* cited by examiner

METHOD AND SYSTEM FOR RE-ACQUIRING SIGNALS OF A WIRELESS BROADCAST NETWORK

CROSS-REFERENCE TO RELATED APPLICATIONS

The present application for patent claims priority to Provisional Application No. 60/669,554 entitled "TECHNIQUES FOR RE-ACQUISITION IN A MOBILE BROADCAST SYSTEM" filed Apr. 7, 2005, hereby expressly incorporated by reference herein.

BACKGROUND

1. Field

The present disclosure relates generally to telecommunications, and more particularly, to systems and methods to support a mobile communications device capable of communicating via a wireless broadcast network.

2. Background

Wireless and wireline broadcast networks are widely deployed to provide various data content to a large group of users. A common wireline broadcast network is a cable network that delivers multimedia content to a large number of households. A cable network typically includes headends and distribution nodes. Each headend receives programs from various sources, generates a separate modulated signal for each program, multiplexes the modulated signals for all of the programs onto an output signal, and sends its output signal to the distribution nodes. Each program may be distributed over a wide geographic area (e.g., an entire state) or a smaller geographic area (e.g., a city). Each distribution node covers a specific area within the wide geographic area (e.g., a community). Each distribution node receives the output signals from the headends, multiplexes the modulated signals for the programs to be distributed in its coverage area onto different frequency channels, and sends its output signal to households within its coverage area. The output signal for each distribution node typically carries both national and local programs, which are often sent on separate modulated signals that are multiplexed onto the output signal.

A wireless broadcast network transmits data over the air to wireless devices within the coverage area of the network. However, a wireless broadcast network can differ from a wireline broadcast network in several key regards. One way in which the two types of networks differ is that mobile handsets may encounter service disruptions, or other activity, that requires them to reacquire or resynchronize with the broadcast signal being transmitted within the wireless broadcast network. While this concern has been previously addressed in various wireless networks in different ways, there remains the need for methods and techniques to control reacquiring wireless broadcast network signals in a way which improves power efficiency of the handset, which utilizes overhead, or control, information instead of the data symbols to resynchronize with a signal, and which advantageously utilizes multiple data channels within both wide-area specific signals and local-area specific signals.

SUMMARY

One aspect of a mobile communications device relates to a method of reacquiring a broadcast signal of a wireless broadcast network. In accordance with this aspect, the broadcast signal having an overhead portion and a data portion is received and a failure, if any, in receiving the broadcast signal is detected. Based on the failure, a part of the overhead portion to reacquire is determined and that part of the overhead portion is then reacquired.

Another aspect of a mobile communications device also relates to a method of reacquiring a broadcast signal of a wireless broadcast network. In accordance with this other aspect the broadcast signal having a wide-area portion and a local-area portion is received. A first failure, if any, is detected in the wide-area portion independent of detecting a second failure, if any, in the local-area portion. The broadcast signal is then reacquired when either the first or second failures are detected.

Yet another aspect of a mobile communications device relates to a device that includes a receiver configured to receive a broadcast signal from a wireless broadcast network, the broadcast signal including a wide-area portion and a local-area portion. The device also includes a processor configured to detect a first failure, if any, in the wide-area portion independent of detecting a second failure, if any, in the local-area portion; and is also configured to control the receiver to reacquire the broadcast signal when either, or both, the first or second failures are detected.

A still further aspect of a mobile communications device relates to a device that includes a receiver and a processor coupled with the receiver. The receiver is configured to receive a broadcast signal from a wireless broadcast network, the broadcast signal including an overhead portion and a data portion. The processor is configured to a) detect a failure, if any, in receiving the broadcast signal; b) determine a part of the overhead portion to reacquire based on the failure; and c) control the receiver to reacquire the part of the overhead portion of the broadcast signal.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein.

DETAILED DESCRIPTION

The detailed description set forth below in connection with the appended drawings is intended as a description of various embodiments of the invention and is not intended to represent the only embodiments in which the invention may be practiced. The detailed description includes specific details for the purpose of providing a thorough understanding of the invention. However, it will be apparent to those skilled in the art that the invention may be practiced without these specific details. In some instances, well known structures and components are shown in block diagram form in order to avoid obscuring the concepts of the invention.

Techniques for broadcasting different types of transmissions (e.g., local and wide-area transmissions) in a wireless broadcast network are described herein. As used herein, "broadcast" and "broadcasting" refer to transmission of content/data to a group of users of any size and may also be referred to as "multicast" or some other terminology. A wide-area transmission is a transmission that may be broadcast by all or many transmitters in the network. A local transmission is a transmission that may be broadcast by a subset of the transmitters for a given wide-area transmission. Different local transmissions may be broadcast by different subsets of the transmitters for a given wide-area transmission. Different wide-area transmissions may also be broadcast by different groups of transmitters in the network. The wide-area and local transmissions typically carry different contents, but these transmissions may also carry the same content.

Figure 1:
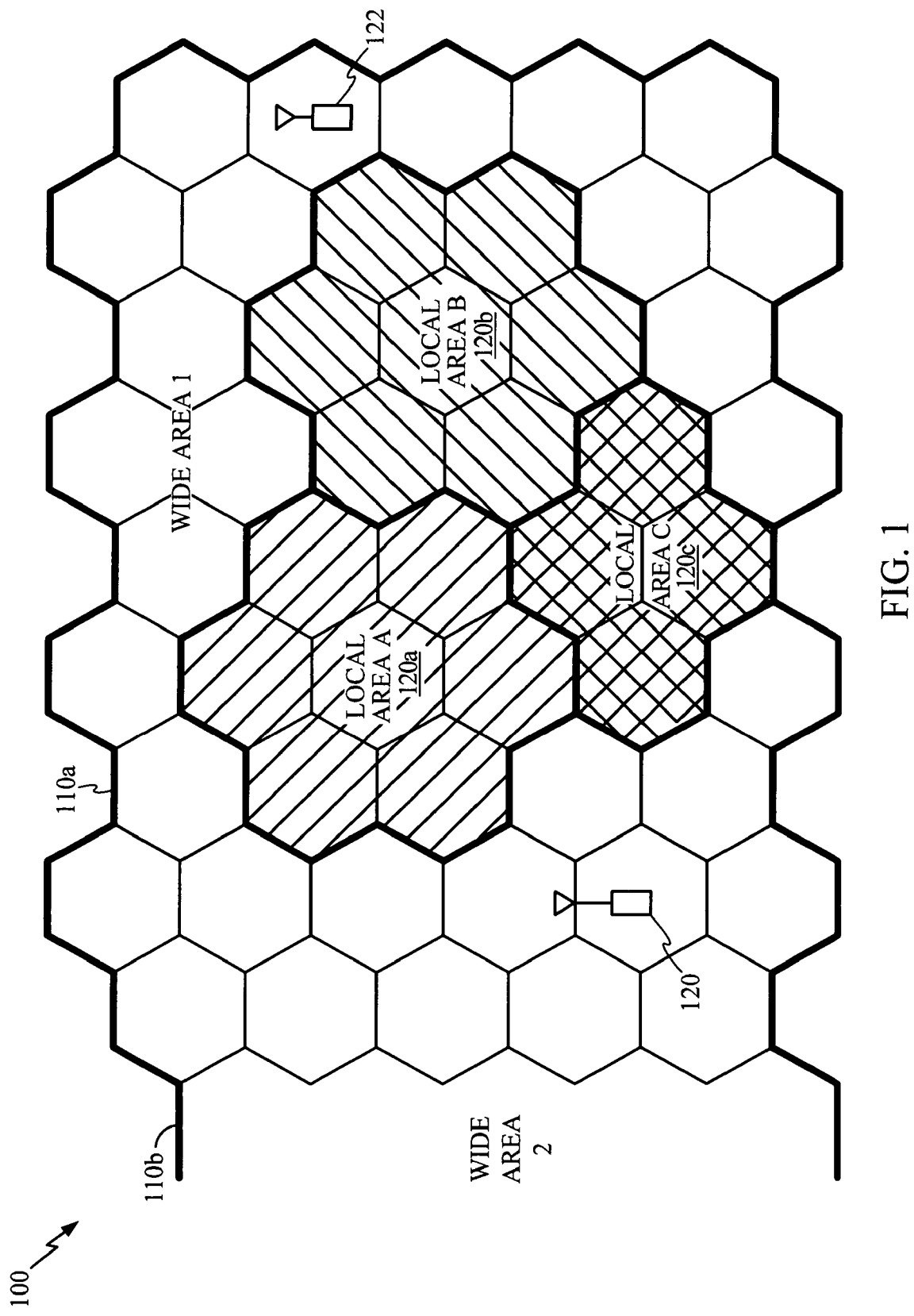
FIG. 1 illustrates an exemplary wireless broadcast network in accordance with the principles of the present invention.

FIG. 1 shows a wireless broadcast network 100 that can broadcast different types of transmission such as, for example, wide-area transmissions and local transmissions. Each wide-area transmission is broadcast by a set of base stations in the network, which may include all or many base stations in the network. Each wide-area transmission is typically broadcast over a large geographic area. Each local transmission is broadcast by a subset of the base stations in a given set for a given wide-area transmission. Each local transmission is typically broadcast over a smaller geographic area. For simplicity, the large geographic area for a wide-area transmission is also called a wide coverage area or simply a "wide area", and the smaller geographic area for a local transmission is also called a local coverage area or simply a "local area". Network 100 may have a large coverage area such as the entire United States, a large region of the United States (e.g., the western states), an entire state, and so on. For example, a single wide-area transmission may be broadcast over the entire state of California, and different local transmissions may be broadcast over different cities such as Los Angeles and San Diego.

For simplicity, FIG. 1 shows network 100 covering wide areas 110a and 110b, with wide-area 110a encompassing three local areas 120a, 120b, and 120c. In general, network 100 may include any number of wide areas with different wide-area transmissions and any number of local areas with different local transmissions. Each local area may adjoin another local area or may be isolated. Network 100 may also broadcast any number of different types of transmission designated for reception over geographic areas of any number of different sizes. For example, network 100 may also broadcast a venue transmission designated for reception over a smaller geographic area, which may be portion of a given local area.

One example of such a broadcast network is the QUALCOMM MediaFLO™ network that delivers a programming lineup at high spectral efficiency. The technology used is an orthogonal frequency division multiplexing (OFDM)-based air interface designed specifically for multicasting a significant volume of rich multimedia content cost effectively to wireless subscribers. It takes advantage of multicasting technology in a single-frequency network to significantly reduce the cost of delivering identical content to numerous users simultaneously. Furthermore, the coexistence of local and wide area coverage within a single RF channel (e.g., 700 MHz) is supported as described above. This segmentation between wide area and local area supports more targeted programming, local advertising, and the ability to blackout and retune as required. MediaFLO™ is merely an example of the type of broadcast networks described herein and other, functionally equivalent broadcast networks are contemplated as well.

Much like cable TV, a subscriber within a wireless broadcast network can subscribe to different packages and tiers of service (e.g., premium movies, sports, etc.) that provide them with a set of channels (e.g., tennis, ESPN, soap operas, BBC, etc.). Different content providers forward the content to the broadcast network which then combines the content and broadcast it according to a predetermined schedule. During provisioning of a user's mobile device the capability to receive and decode the channels to which the user subscribes is programmed into the mobile device. The provisioning may be subsequently updated to remove or add other packages and channels. Thus, there is a broadcast network operator that broadcasts a variety of content, but there is also the carrier (e.g., Verizon, Xingular, etc.), who provisions the handsets, that determine what portions of the content can be subscribed to by a user of the carrier. One of ordinary skill will recognize that the hierarchical arrangement of channels just described is merely one example of how to provide multimedia and other content. Other arrangements and organization of the data and its respective channels may be utilized without departing from the scope of the present invention.

Figure 2:
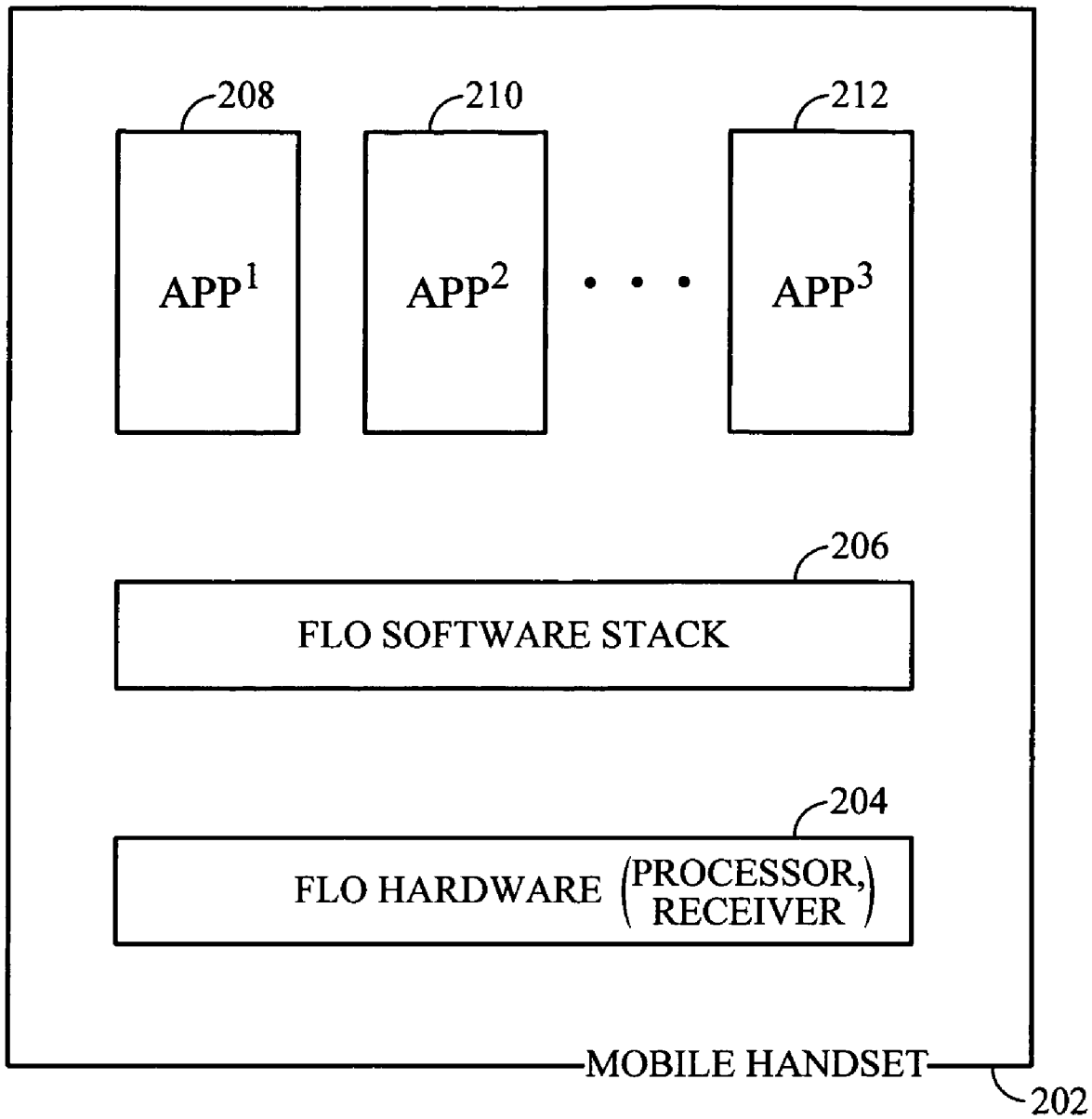
FIG. 2 illustrates a logical diagram of a wireless handset for receiving broadcast content within the environment of FIG. 1.

A logical view of a mobile handset for operation within a wireless broadcast network is illustrated in FIG. 2. In particular, there are a number of different applications 208, 210, 212 that execute within the operating system of the handset 202 to receive content that is broadcast over the wireless broadcast network. These applications 208, 210, 212, may, for example, include streaming video viewers, streaming audio players, news services, stock services, sports scorers, etc. They typically operate within a wireless operating system such as BREW or its equivalents.

Logically, these applications sit on "top" of a software stack 206 that itself communicates with the hardware 204 of the handset 202. In operation, the hardware (e.g., processor, receiver, etc.) is configured to receive the signals broadcast over the wireless broadcast network and to pass them through to the software stack 206. The software stack 206 unencapsulates the signals received from the hardware layer 204 and provides them in an appropriate format to the different applications 208, 210, 212.

While the handset 202 is receiving signals and operating normally, the handset 202 typically acquires a signal initially using attributes of that signal. For example, assuming the signal is sent in a frame-like structure, pilots signals may be broadcast within a frame which allow the handset 202 to determine when the frame begins. The acquisition process may also include a finer timing resolution and/or channel estimation capability that allows the handset to set an automatic gain level or a frequency compensation value. As long as the signal continues to be received in an acceptable manner, the handset 202 will not typically have to reacquire the signal, after the initial acquisition, except in limited circumstances. However, if there is a disruption to reception of the broadcast signal, then reacquiring the broadcast signal may be necessary.

Figure 3:
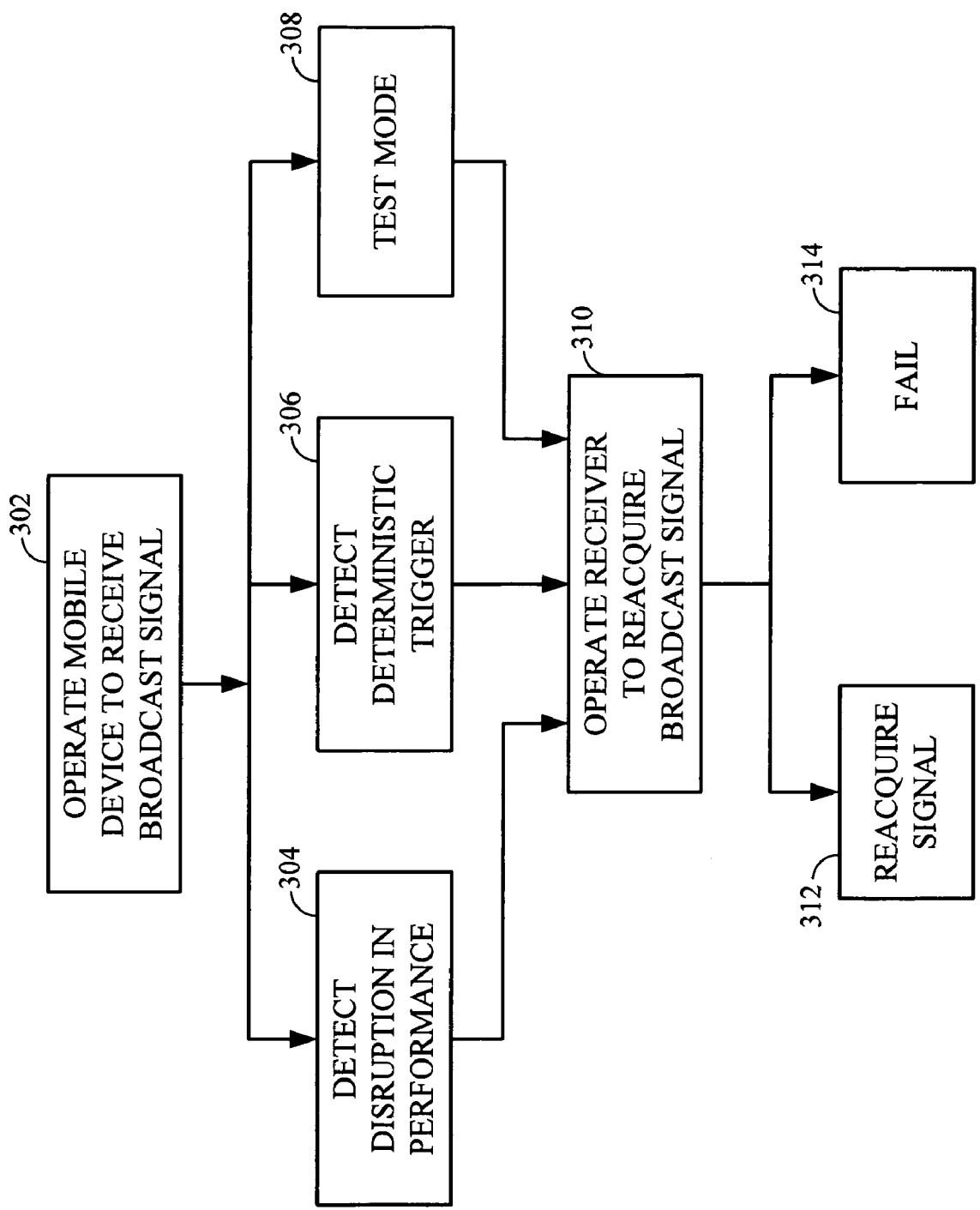
FIG. 3 depicts a flowchart of an exemplary method for placing a receiver of a wireless handset in a mode to reacquire a broadcast signal.

The flowchart of FIG. 3 depicts an exemplary method for reacquiring a broadcast signal under a variety of circumstances. In step 302, the mobile handset is operated, as would typically be done, so as to receive, demodulate and decode a signal transmitted in a wireless broadcast network. This operation may result in the handset receiving signals from two or more different networks such that the handset determines which network to select for reception. Furthermore, the broadcast signal may include both data intended for a local area and other data intended for a wide area. In at least three different instances, the handset may determine that the broadcast signal should be reacquired.

In step 304, representing a first instance, the handset detects a disruption in performance. This disruption in performance may be evidenced by signal strength or other characteristics of the broadcast signal. One exemplary detection method involves determining if errors are encountered during the decoding of physical layer packets encapsulated within the signal. For example, if 16 physical layer packets are received and decoded within the broadcast signal, then the handset may determine a performance disruption has occurred if more than 25% of the packets have errors when decoded. The threshold 25% is exemplary in nature and can be any of a variety of values based on the error-correcting and error-detecting codes employed in formatting the broadcast signal. One of ordinary skill will recognize that setting this threshold is a balance between correctly detecting when sufficient errors occur but minimizing the amount of times a problem is falsely detected. When the error threshold is detected, the handset determines that the broadcast signal should be reacquired.

Another instance, shown in step 306, involves deterministic triggers that cause the handset to operate in a mode to reacquire the broadcast signal. One example of such a deterministic signal is when a user of the handset changes a channel (e.g., an audio channel or a video-viewing channel). In response, the handset may need to identify where in the broadcast signal the new channel is located. Thus, the handset operates to receive and decode the overhead, or control, information that identifies channel locations. As explained in more detail later, the broadcast signals may include many different channels broadcast at different times during a broadcast frame. By operating the receiver, demodulator, and decoder only during the period in which a desired channel is being broadcast, the handset can effect significant power savings. Another example of a deterministic trigger is when the handset awakes from a sleep mode. For example, the user may be operating an application such as an IP datacast in which data is broadcast and received only periodically (e.g., once every 20 sec). Thus, the handset can enter a sleep mode in between each reception. However, upon awakening, the handset will reacquire the signal (to reestablish synchronization and timing) so that the next portion of the IP datacast can be received and decoded.

The third instance shown in FIG. 3 involves a test mode 308. In this mode, the handset may remain operating such that it receives and decodes the pilot and overhead information in every frame being broadcast. As mentioned previously, the pilot signal may be used for a number of different purposes, one of which involves estimating the transmission channel characteristics. Sampling the pilot signals from every frame, rather than only an initial frame, offers a more detailed analysis of the channel and can be used to improve gain and frequency settings of the handset transceiver.

In each of the three instances described above, as a result of some trigger, the receiver of the handset is operated so as to reacquire the broadcast signal, as shown in step 310. Reacquisition typically involves receiving and decoding one or more pilot signals and other overhead, or control, signals. As explained in more detail later, there are instances in which both pilot signals and overhead signals are used to reacquire the broadcast signal and there are other instances in which just a portion is used. The step of reacquiring the signal, in step 310, may be performed iteratively. For example, in attempting to reacquire the signal, different problems may occur, such as a) the handset may be unable to detect the pilot signals, b) the overhead information may be detected but include one or more errors when decoded, or c) the physical layer packets of the broadcast channels may, themselves, continue to include errors when they are decoded. In each of these instances, the handset continues to attempt to reacquire the broadcast signal until it is successful. If these reacquisition attempts were to continue indefinitely, then power would be quickly consumed by the handset and the battery rapidly depleted. Accordingly, a timeout feature may be included so that the handset may determine that the service has truly been lost and no more attempts should be made to reacquire the signal.

Thus, the result from step 310 is either that the signal is successfully reacquired, step 312; or the handset fails to reacquire the signal, step 314. In response to successful reacquisition, the handset continues to operate normally. In response to a failure to reacquire the signal, the handset may stop attempting to reacquire the signal until an application 208, 210, 212 once again executes a request for the signal or may periodically awake from a sleep mode and attempt to reacquire the signal.

The specific way in which the broadcast network signals can be arranged and broadcast can vary greatly without departing from the spirit and scope of the present invention. Additionally, the particular format and encoding of notification messages and control channel information can vary as well. Described below, however, is one particular implementation of a wireless broadcast network within which the method in flowchart 3 may be implemented.

More particularly, the data, pilots, and overhead information for local and wide-area transmissions may be multiplexed in various manners. For example, the data symbols for the wide-area transmission may be multiplexed onto a "transmission span" allocated for the wide-area transmission, the data symbols for the local transmission may be multiplexed onto a transmission span allocated for the local transmission, the TDM and/or FDM pilots for the wide-area transmission may be multiplexed onto a transmission span allocated for these pilots, and the TDM and/or FDM pilots for the local transmission may be multiplexed onto a transmission span allocated for these pilots. The overhead information for the local and wide-area transmissions may be multiplexed onto one or more designated transmission spans. The different transmission spans may correspond to (1) different sets of frequency subbands if FDM is utilized by the wireless broadcast network, (2) different time segments if TDM is utilized, or (3) different groups of subbands in different time segments if both TDM and FDM are utilized. Various multiplexing schemes are described below. More than two different types of transmission with more than two different tiers of coverage may also be processed, multiplexed, and broadcast. A wireless device in the wireless broadcast network performs the complementary processing to recover the data for the local and wide-area transmissions.

Figure 4:
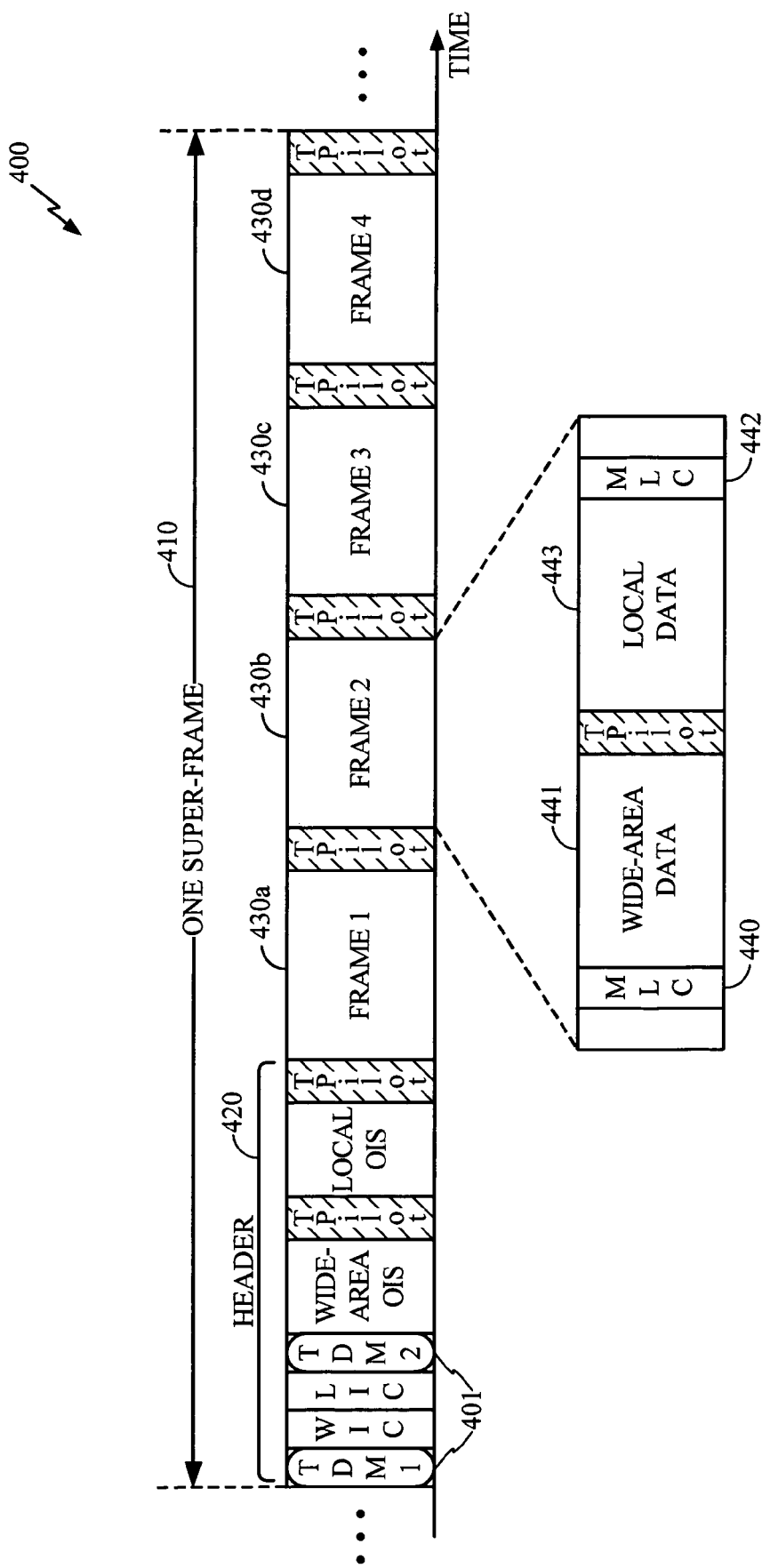
FIG. 4 depicts an exemplary superframe that can be used to provide content within a wireless broadcast network such as that of FIG. 1.

FIG. 4 shows an exemplary super-frame structure 400 that may be used to broadcast local and wide-area transmissions in an OFDM-based wireless broadcast network. Data transmission occurs in units of super-frames 410. Each super-frame spans a predetermined time duration, which may be selected based on various factors such as, for example, the desired statistical multiplexing for data streams being broadcast, the amount of time diversity desired for the data streams, acquisition time for the data streams, buffer requirements for the wireless devices, and so on. A super-frame size of approximately one second may provide a good tradeoff between the various factors noted above. However, other super-frame sizes may also be used.

For the embodiment shown in FIG. 4, each super-frame 410 includes a header segment 420, four equal-size frames 430a through 430d, and a trailer segment 440, which are not shown to scale in FIG. 4. Table 1 lists the various fields for segments 420 and 440 and for each frame 430.

| Fields | Description |
| --- | --- |
| TDM Pilot | TDM Pilot used for signal detection, frame synchronization, frequency error estimation, and time synchronization |
| Transition Pilot | Pilot used for channel estimation and possibly time synchronization and sent at the boundary of wide-area and local fields/transmissions |
| WIC | Wide-Area identification channel—carries an identifier assigned to the wide-area being served |
| LIC | Local identification channel—carries an identifier assigned to the local area being served |
| Wide-Area OIS | Wide-Area overhead information symbol—carries overhead information (e.g., frequency/time location and allocation) for each data channel being sent in the wide-area data field |
| Local OIS | Local overhead information symbol—carries overhead information for each data channel being sent in the local data field |
| Wide-Area Data | Carries data channels for the wide-area transmission |
| Local Data | Carries data channels for local transmission |

For the embodiment shown in FIG. 4, different pilots are used for different purposes. A pair of TDM pilots 401 are transmitted at or near the start of each super-frame and may be used for the purposes noted in Table 1. For example, one of the pilots TDM1 may be used for coarse timing to detect the beginning of the frame 400, while the other pilot TDM2 may be used to provide a long channel estimate. A transition pilot is sent at the boundary between local and wide-area fields/transmissions, and allows for seamless transition between the local and wide-area fields/transmissions.

The local and wide-area transmissions may be for multimedia content such as video, audio, teletext, data, video/audio clips, and so on, and may be sent in separate data streams. For example, a single multimedia (e.g., television) program may be sent in three separate data streams for video, audio, and data. The data streams are sent on data channels. Each data channel may carry one or multiple data streams. A data channel carrying data streams for a local transmission is also called a "local channel", and a data channel carrying data streams for a wide-area transmission is also called a "wide-area channel". The local channels are sent in the Local Data fields and the wide-area channels are sent in the Wide-Area Data fields of the super-frame. Thus, within the wide-area data 441 of a frame 430b, there are a number of media logical channels (MLCs) 440 (although only one is depicted in FIG. 4. Each MLC is a logical channel that represents a separate video, audio, or data stream. The local data 443 is also separated into many different logical channels 442. When decoding portions of a frame, the mobile device may receive and decode only the MLC 440, 442 for which an application is requesting data. As explained in more detail herein, the timing information, or "location" of the MLC 440, 442, is included in the overhead information (i.e., Wide-Area OIS and Local OIS) of the header 420.

Each data channel may be "allocated" a fixed or variable number of interlaces in each super-frame depending on the payload for the data channel, the availability of interlaces in the super-frame, and possibly other factors. Each data channel may be active or inactive in any given super-frame. Each active data channel is allocated at least one interlace. Each active data channel is also "assigned" specific interlaces within the super-frame based on an assignment scheme that attempts to (1) pack all of the active data channels as efficiently as possible, (2) reduce the transmission time for each data channel, (3) provide adequate time-diversity for each data channel, and (4) minimize the amount of signaling needed to indicate the interlaces assigned to each data channel. For each active data channel, the same interlace assignment may be used for the four frames of the super-frame.

The Local OIS field indicates the time-frequency assignment for each active local channel for the current super-frame. The Wide-Area OIS field indicates the time-frequency assignment for each active wide-area channel for the current super-frame. The Local OIS and Wide-Area OIS are sent at the start of each super-frame to allow the wireless devices to determine the time-frequency location of each data channel of interest in the super-frame.

The various fields of the super-frame may be sent in the order shown in FIG. 4 or in some other order. In general, it is desirable to send the TDM pilot and overhead information early in the super-frame so that the TDM pilot and overhead information can be used to receive the data being sent later in the super-frame. The wide-area transmission may be sent prior to the local transmission, as shown in FIG. 4, or after the local transmission.

FIG. 4 shows a specific super-frame structure. In general, a super-frame may span any time duration and may include any number and any type of segments, frames, and fields. However, there is normally a useful range of super-frame durations related to acquisition time and cycling time for the receiver electronics. Other super-frame and frame structures may also be used for broadcasting different types of transmission, and this is within the scope of the invention.

The pilot signals of FIG. 4 that are transmitted during the broadcast transmission may be used to derive (1) a channel estimate for the wide-area transmission, which is also called a wide-area channel estimate, and (2) a channel estimate for the local transmission, which is also called a local channel estimate. The local and wide-area channel estimates may be used for data detection and decoding for the local and wide-area transmissions, respectively. These pilots may also be used for channel estimation, time and frequency synchronization, acquisition (e.g., automatic gain control (AGC)), and so on. The transition pilot may also be used to obtain improved timing for the local transmission as well as the wide-area transmission.

The exemplary pilot signals and the overhead information structure within the superframe 400 just described may be advantageously used to detect reception errors occurring during operation of the handset and facilitate recovery, or reacquisition, of the broadcast signal. The flowcharts that follow depict exemplary methods of signal reacquisition that consider that more than one MLC may be received and decoded at one time and that one MLC may be a wide area signal while another MLC may be a local-area signal. Thus, while many of the features discussed rely on some specific portions of the superframe, other features are applicable to broadcast networks in general in which multiple program channels are viewed or decoded concurrently.

Figure 5:
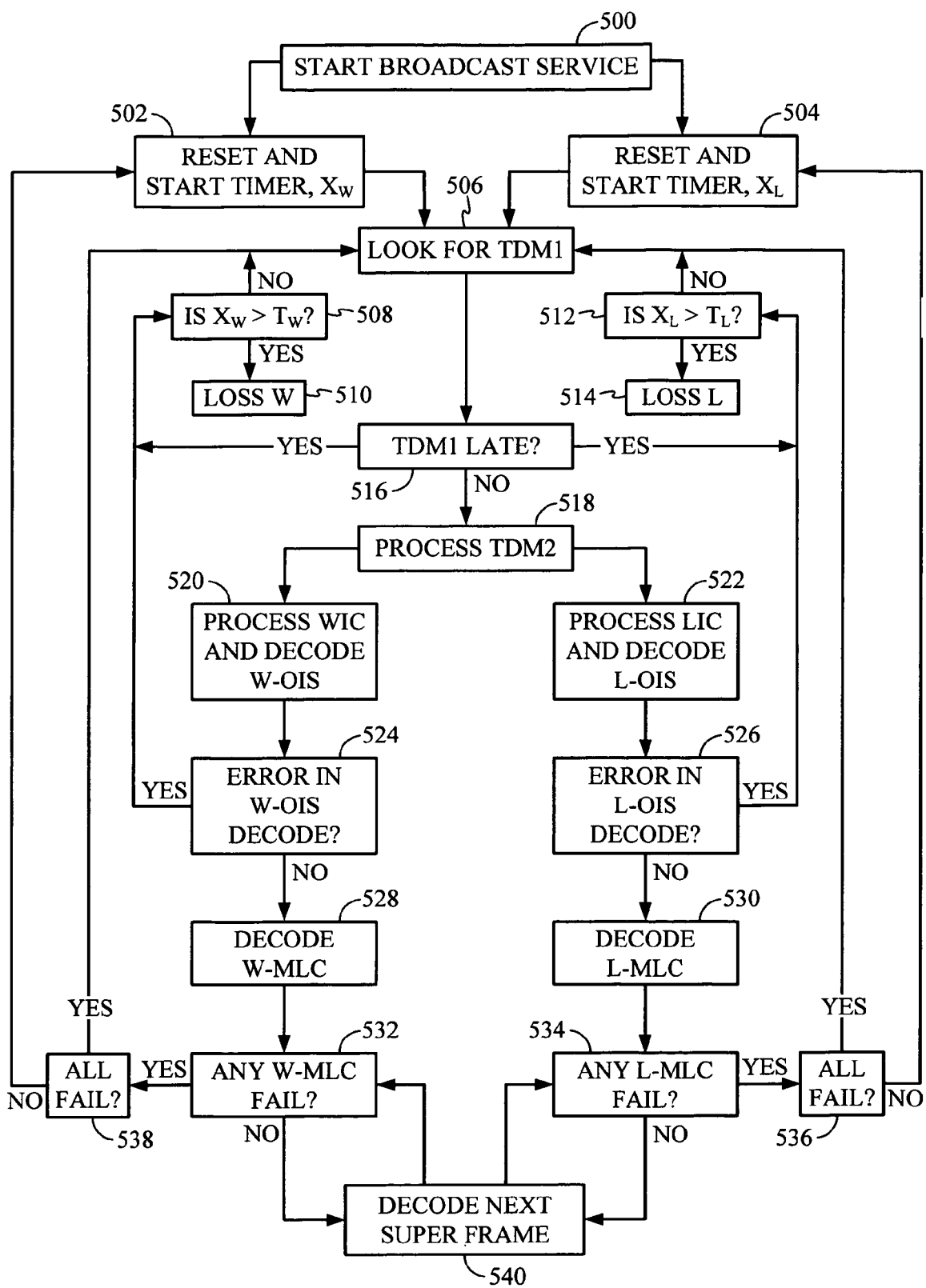
FIG. 5 depicts a flowchart of and exemplary method of reacquiring a broadcast signal after a loss of lock with the signal.

FIG. 5 depicts an exemplary flowchart relating to reacquisition of a wireless broadcast network signal that may include wide-area and local-area information as well as multiple channels in each such area. Reacquisition refers to a scenario in which some or all of the overhead and pilot symbols are processed after initial power-up. The flowchart of FIG. 5 depicts concurrent, but decoupled, handling of both the local information and the wide-area information. In particular, generally the left-side of FIG. 5 relates to handling wide-area information and generally the right-side relates to handling local-area information. Thus, one of ordinary skill will recognize that some of the processing steps of the flowchart of FIG. 5 may not be performed if only wide-area channels (or only local-area channels) of data are being received.

In step 500, a mobile handset begins receiving wireless broadcast network signals such as the exemplary superframe 400 of FIG. 4. In steps 502 and 504 a respective timer $X_W$ and $X_L$ are initialized. This timer may be a clock timer that operates off a real time clock of the handset or it may be a counter that is periodically incremented. Thus, the term "timer" is used generically to refer to either a particular time period or a number of iterations that are counted. Once each timer is initialized, the receiver of the handset attempts to detect TDM1, in step 506. For example, a preset number of OFDM symbols before TDM1 is expected, the receiver can begin looking for TDM1 to identify whether the expected rising edge, flat zone and falling edge criteria of TDM1 are satisfied. If TDM1 is not successfully detected in the expected time period, then in step 516, the handset determines that TDM1 is late. If TDM1 is late, then further processing of the broadcast signal is not attempted and step 506 is repeated to look for TDM1 again. However, before looking for TDM1 in step 506, the timer $X_W$ is compared to a threshold value $T_W$, in step 508, to see if it exceeds that threshold. If $T_W$ is exceeded, then this indicates that the handset has been unable to reacquire the broadcast signal for an extended period of time, or for an extended number of attempts. An exemplary value for $T_W$ is 60 seconds, but other threshold values may be selected as well. If the threshold value is exceeded, then processing continues, in step 510, with a routine to handle loss of service. If the threshold value is not exceeded, then processing continues by once again looking for TDM1 in step 506. A similar threshold value $T_L$ and comparison exist with respect to local-area service as well. The comparison occurs in step 512 and the loss of service routine is handled in step 514.

If, however, TDM1 is successfully detected, then TDM2 is processed, in step 518. The description below of the flowchart of FIG. 5 first describes the wide-area side of the flowchart and then the local-area side; although described separately, the steps may occur concurrently. Once WIC and TDM2 are processed, the W-OIS is decoded, in step 520. The W-OIS includes a number of physical layer packets that represent the overhead information related to the wide-area related broadcast signals. If an error occurs, in step 524, when decoding the W-OIS, then reacquisition is considered unsuccessful and processing continues by checking the timer $X_W$ in step 508 and once again looking for TDM1 in step 506. As for what constitutes an "error" when decoding the W-OIS, it may be, for example, if decoding of any of the physical layer packets results in an error.

Once, the W-OIS is successfully decoded, then the one or more W-MLCs that the handset is receiving are decoded as well, in step 528. Decoding of a W-MLC involves receiving, demodulating, and decoding the physical layer packets of that W-MLC from each of the four frames of the superframe. In step 532, it is determined whether a failure occurred when decoding the W-MLCs. Each W-MLC is advantageously considered separately such that an error in decoding one W-MLC does not necessarily mean that an error occurred for another W-MLC or for the entire superframe. Those W-MLCs that were successfully decoded have their data available and useful for the one or more applications executing on the handset. Those W-MLCs that were unsuccessfully decoded have their data discarded so that the applications on the handset are not provided with corrupted data.

Determining whether or not failure occurred when decoding a particular W-MLC may be accomplished a variety of different ways. For example, the number of physical layer packets for a particular MLC that have an error during decoding may be counted and if the number exceeds a threshold, then that W-MLC is considered to have failed. Each W-MLC may advantageously be Reed-Solomon encoded so that all the physical layer packets (PLPs) may still be recovered even if a few included errors. For example, if the PLPs are encoded using a (16,k) RS code, then all PLPs can be recovered even if 16-k PLPs include an error. Thus, in a (16,12) RS encoding scheme, more than four (or 25%) of the PLPs must be in error before declaring an W-MLC failure. One of ordinary skill will recognize that many different encoding schemes are possible (even no encoding scheme at all) and in each such case, an appropriate error level can be determined for declaring when decoding of a particular W-MLC has failed. The number of errors, or the percentage of errors, that cause a W-MLC to be identified as a "failed" decode may be based on each frame within the superframe or may be based on the entire superframe.

If no errors, occur in any of the W-MLCs, then the next superframe is decoded, in step 540, without any reacquisition of the header information of the superframe. This loop of decoding superframes continues until a W-MLC failure occurs.

In step 538, a test is performed to determine if all W-MLCs have failed. Regardless of whether all W-MLCs have failed or only a portion of W-MLCs have failed, the handset considers that synchronization with the broadcast signal has been lost and TDM1 is reacquired in step 506. However, treatment of the timer $X_W$ is different depending on whether only some or all of the W-MLCs have failed. If all have failed, then there might be an entire failure of the wide-area broadcast service, not just one or more specific channels. If some W-MLCs are decoded properly, then the broadcast service remains active and just a portion of the channels are experiencing errors. In the case where all W-MLCs have failed, the timer $X_W$ continues to run, or is incremented, so that the test of step 508 can determine if loss of the wide-area service has occurred. If at least one W-MLC is decoded properly, then the timer $X_W$ is reset to zero.

The behavior just described with respect to wide-area broadcast signals and channels is concurrently performed for any local media logical channels (L-MLCs) being received by the handset as well. Thus, the details of how steps 504, 512, 514, 522, 526, 530, 534, and 536 are performed can be readily ascertained from the above description related to W-MLCs. Accordingly, the reacquisition of the broadcast signal decouples error detecting in wide-area channels from that in local-area channels as well as decouples error checking of each channel from one another as well.

If loss of broadcast service is detected in either step 510 or 514, then the handset can indicate to the user via an interface screen that service has been lost. The message may be specifically that wide-area service has been lost, the local-area service has been lost, or both services have been lost. The user can then be presented and allowed to select an option to "Try Again?" which will re-start the reacquisition program. Alternatively, an idle timer may be started such that the handset enters an idle, or sleep, mode for the duration of the timer. When the timer expires, then the reacquisition attempt can be restarted. The idle timer may be combined or separate for the local and wide-area service. For example, if the idle timer lasts 5 minutes and the local-area service was lost 3 minutes ago. Then, if the wide-area service is lost, the idle timer can reset to 5 minutes so that 8 minutes actually expire before reacquisition is attempted.

The flowchart of FIG. 5 for reacquiring the broadcast signal after a loss of lock with the signal is merely exemplary in nature. One of ordinary skill will recognize that many additional refinements may be made to the method described without departing from the spirit and scope of the present invention. For example, the failure of an MLC in a single superframe may not be enough to consider that channel "failed". Instead, the failure of the MLC in 2 (or more) consecutive superframes may be the criteria for determining if that channel has failed and reacquisition should be accomplished. Furthermore, in FIG. 5, reacquisition always begins with looking for TDM1 and then proceeding with processing the other header information (e.g., WIC/LIC, WOIS, LOIS, TDM2, etc.). Such behavior is not necessary, based on the type of signal failure that occurs, TDM1 may not need to be reacquired to perform reacquisition of the broadcast signal in certain instances. The following table represents a variety of different scenarios and identifies which header information is used to reacquire the broadcast signal in each scenario. In the table, a "1" denotes that the header information is processed and decoded while a "0" indicates that the reacquisition process for that scenario does not detect or decode that particular header information.

specific to the exemplary superframe structure of FIG. 4. In more general terms, the header information includes information about the broadcast signal such as timing information, frequency information, coverage area identification, and channel information. One of ordinary skill will recognize that this overhead information may be broadcast in a variety of different ways other than the specific superframe structure of FIG. 4.

During the processing steps 520, 522 of the flowchart of FIG. 5, a new WID or LID may be detected which would indicate that the mobile handset may have moved from one coverage area to another. If this is the case, then the receiver switches to the new WOI or LOI indicated by the new signals. However, there are other instances in which the detection of a new WID or LID is more of a transient event and switching to the new WOI or LOI would not be advantageous. Thus, a hysteresis timer may be used within the flowchart of FIG. 5 to prevent unnecessary switching to a new WOI or LOI. In operation, the hysteresis timer may prevent switching to the new WOI or LOI until the new WID or LID is successfully detected x consecutive times. Once the new WID or LID is detected for the predetermined number of consecutive times, then communication switches to the new WOI or LOI. The above-described hysteresis timer functionality may operate independently for the WOI and the LOI.

FIG. 6 shows a block diagram of a base station 1010 and a wireless device 1050 that may be used to implement the wireless broadcast network 100 in FIG. 1. Base station 1010 is generally a fixed station and may also be called an access point, a transmitter, or some other terminology. Wireless device 1050 may be fixed or mobile and may also be called a user terminal, a mobile station, a receiver, or some other terminology. Wireless device 1050 may also be a portable unit such as a cellular phone, a handheld device, a wireless module, a personal digital assistant (PDA), and so on.

At base station 1010, a transmit (TX) data processor 1022 receives data for a wide-area transmission from sources 1012, processes (e.g., encodes, interleaves, and symbol maps) the wide-area data, and generates data symbols for the wide-area

| Scenario | TDM1 | WIC | LIC | TDM2 | WOIS | LOIS |
|---|---|---|---|---|---|---|
| W-MLC loss (no L-MLCs) | 0 | 1 | 0 | 1 | 1 | 0 |
| L-MLC loss (no W-MLCs) | 0 | 1 | 1 | 1 | 0 | 1 |
| W-MLC loss (L-MLC success) | 0 | 1 | 0 | 0 | 1 | 0 |
| L-MLC loss (W-MLC success) | 0 | 0 | 1 | 0 | 0 | 1 |
| W-MLC and L-MLC loss | 0 | 1 | 1 | 1 | 1 | 1 |
| TDM1 Late or WOIS fail (no LOIS decoding) | 1 | 1 | 0 | 1 | 1 | 0 |
| TDM1 Late or LOIS fail (no WOIS decoding) | 1 | 1 | 1 | 1 | 0 | 1 |
| WOIS failure (LOIS success) | 0 | 1 | 0 | 0 | 1 | 0 |
| LOIS failure (WOIS success) | 0 | 0 | 1 | 0 | 0 | 1 |
| TDM1 late or WOIS and LOIS fail | 1 | 1 | 1 | 1 | 1 | 1 |

As a result of the logic represented by the table above, the flowchart of FIG. 5 may be modified so that reacquisition of a broadcast signal may be dependent on what type of failure occurs. In particular, reacquisition will involve only certain portions of the header information and will not require all pieces of the header of the superframe to be detected and decoded. Similar logic may be applied to the deterministic triggers discussed above as well. For example, if the user simply wants to change from one W-MLC to another, then TDM1 does not necessarily need to be reacquired, only WOIS does. Similarly, in this instance, the LOIS is not necessarily decoded either. The header information identified above is transmission. A data symbol is a modulation symbol for data, and a modulation symbol is a complex value for a point in a signal constellation for a modulation scheme (e.g., M-PSK, M-QAM, and so on). TX data processor 1022 also generates the FDM and transition pilots for the wide area in which base station 1010 belongs and provides the data and pilot symbols for the wide area to a multiplexer (Mux) 1026. A TX data processor 1024 receives data for a local transmission from sources 1014, processes the local data, and generates data symbols for the local transmission. TX data processor 1024 also generates the pilots for the local area in which base station 1010 belongs and provides the data and pilot symbols for the local area to multiplexer 1026. The coding and modulation for data may be selected based on various factors such as, for example, whether the data is for wide-area or local transmission, the data type, the desired coverage for the data, and so on.

Multiplexer 1026 multiplexes the data and pilot symbols for the local and wide areas as well as symbols for overhead information and the TDM pilot onto the subbands and symbol periods allocated for these symbols. A modulator (Mod) 1028 performs modulation in accordance with the modulation technique used by network 100. For example, modulator 1028 may perform OFDM modulation on the multiplexed symbols to generate OFDM symbols. A transmitter unit (TMTR) 1032 converts the symbols from modulator 1028 into one or more analog signals and further conditions (e.g., amplifies, filters, and frequency upconverts) the analog signal(s) to generate a modulated signal. Base station 1010 then transmits the modulated signal via an antenna 1034 to wireless devices in the network.

At wireless device 1050, the transmitted signal from base station 1010 is received by an antenna 1052 and provided to a receiver unit (RCVR) 1054. Receiver unit 1054 conditions (e.g., filters, amplifies, and frequency downconverts) the received signal and digitizes the conditioned signal to generate a stream of data samples. A demodulator (Demod) 1060 performs (e.g., OFDM) demodulation on the data samples and provides received pilot symbols to a synchronization (Sync)/channel estimation unit 1080. Unit 1080 also receives the data samples from receiver unit 1054, determines frame and symbol timing based on the data samples, and derives channel estimates for the local and wide areas based on the received pilot symbols for these areas. Unit 1080 provides the symbol timing and channel estimates to demodulator 1060 and provides the frame timing to demodulator 1060 and/or a controller 1090. Demodulator 1060 performs data detection on the received data symbols for the local transmission with the local channel estimate, performs data detection on the received data symbols for the wide-area transmission with the wide-area channel estimate, and provides detected data symbols for the local and wide-area transmissions to a demultiplexer (Demux) 1062. The detected data symbols are estimates of the data symbols sent by base station 1010 and may be provided in log-likelihood ratios (LLRs) or some other form.

Demultiplexer 1062 provides detected data symbols for all wide-area channels of interest to a receive (RX) data processor 1072 and provides detected data symbols for all local channels of interest to an RX data processor 1074. RX data processor 1072 processes (e.g., deinterleaves and decodes) the detected data symbols for the wide-area transmission in accordance with an applicable demodulation and decoding scheme and provides decoded data for the wide-area transmission. RX data processor 1074 processes the detected data symbols for the local transmission in accordance with an applicable demodulation and decoding scheme and provides decoded data for the local transmission. In general, the processing by demodulator 1060, demultiplexer 1062, and RX data processors 1072 and 1074 at wireless device 1050 is complementary to the processing by modulator 1028, multiplexer 1026, and TX data processors 1022 and 1024, respectively, at base station 1010.

Controllers 1040 and 1090 direct operation at base station 1010 and wireless device 1050, respectively. These controllers may be hardware-based, software-based or a combination of both. Memory units 1042 and 1092 store program codes and data used by controllers 1040 and 1090, respectively. A scheduler 1044 schedules the broadcast of local and wide-area transmissions and allocates and assigns resources for the different transmission types.

Figure 6A:
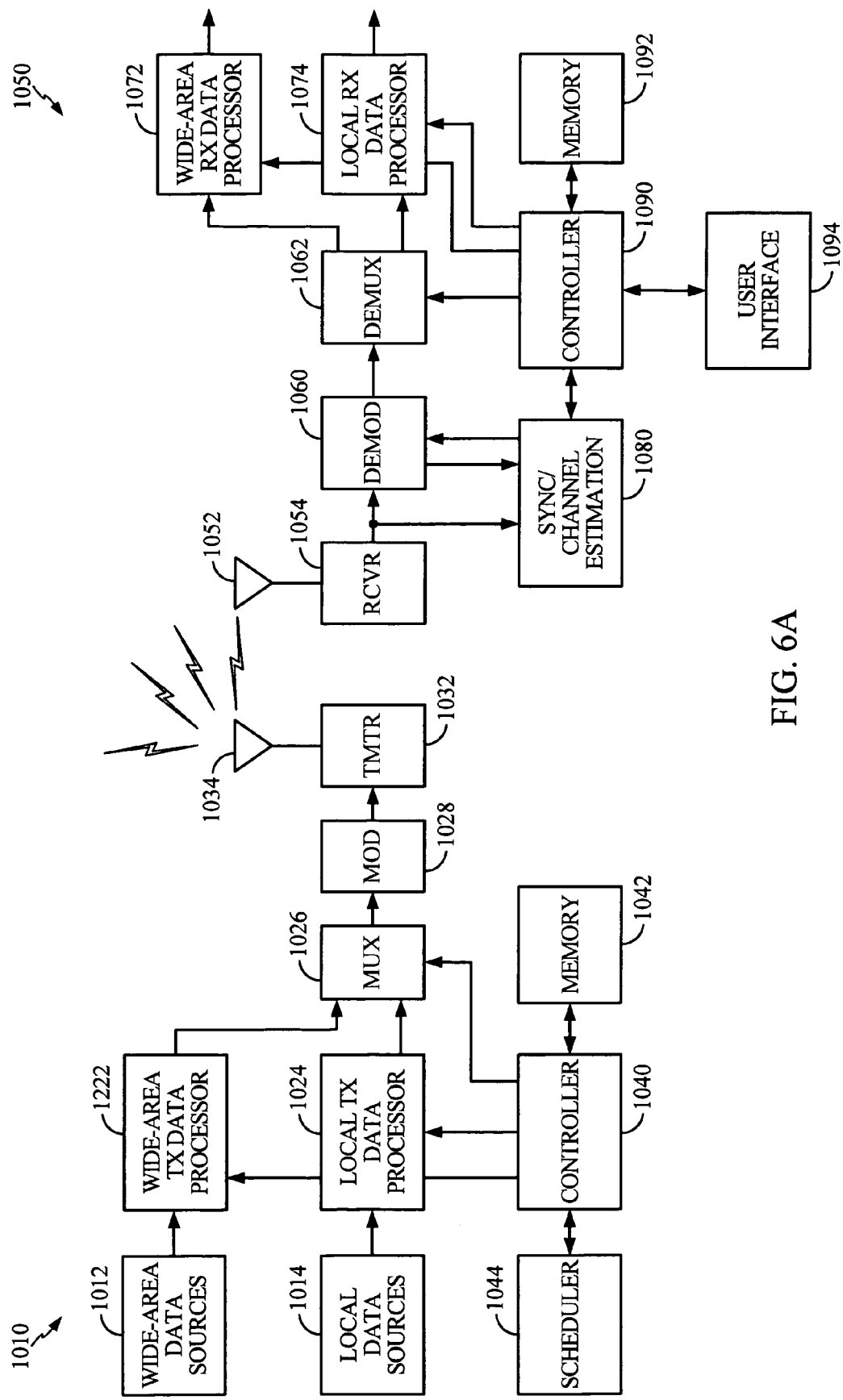
FIG. 6A depicts a block diagram of a wireless broadcast base station and handset.

For clarity, FIG. 6A shows the data processing for the local and wide-area transmissions being performed by two different data processors at both base station 1010 and wireless device 1050. The data processing for all types of transmission may be performed by a single data processor at each of base station 1010 and wireless device 1050. FIG. 6A also shows the processing for two different types of transmission. In general, any number of types of transmission with different coverage areas may be transmitted by base station 1010 and received by wireless device 1050. For clarity, FIG. 6A also shows all of the units for base station 1010 being located at the same site. In general, these units may be located at the same or different sites and may communicate via various communication links. For example, data sources 1012 and 1014 may be located off site, transmitter unit 1032 and/or antenna 1034 may be located at a transmit site, and so on. A user interface 1094 is also in communication with the controller 1090 that allows the user of the device 1050 to control aspects of its operation. For example, the interface 1094 can include a keypad and display along with the underlying hardware and software needed to prompt a user for commands and instructions and then to process them once they are received.

Figure 6B:
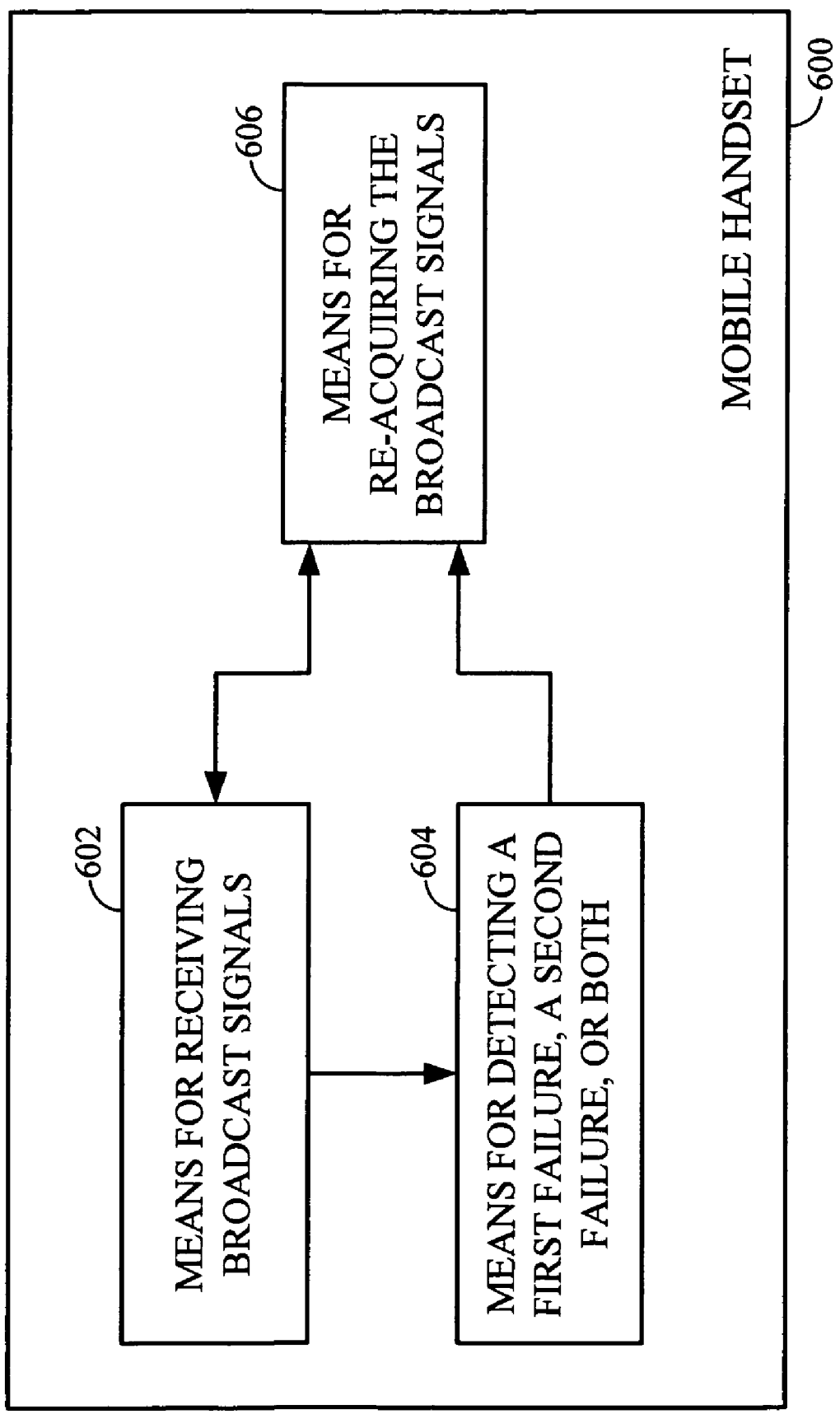
FIG. 6B depicts a functional-level diagram of a wireless handset on which the exemplary method of FIG. 5 may be implemented.

FIG. 6B depicts a functional-level diagram of a wireless handset on which the exemplary method of FIG. 5 may be implemented. A mobile handset 600 includes receiving means 602 for receiving signals of a wireless broadcast network. These broadcast signals may, for example, include both a local portion and a wide-area portion. An error detecting means 604 is provided that can detect errors of a first type (e.g., in the local-area signals), errors of a second type (e.g., errors in the wide-area signals), or both types of errors. In any case, if an error is detected, then means 606 are included which control the receiving means 602 to reacquire the signals of the wireless broadcast network.

The techniques described herein for broadcasting different types of transmission over the air may be implemented by various means. For example, these techniques may be implemented in hardware, software, or a combination thereof. For a hardware implementation, the processing units at a base station used to broadcast different types of transmission may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units at a wireless device used to receive different types of transmission may also be implemented within one or more ASICs, DSPs, and so on.

For a software implementation, the techniques described herein may be implemented with modules (e.g., procedures, functions, and so on) that perform the functions described herein. The software codes may be stored in a memory unit (e.g., memory unit 1042 or 1092 in FIG. 6A) and executed by a processor (e.g., controller 1040 or 1090). The memory unit may be implemented within the processor or external to the processor, in which case it can be communicatively coupled to the processor via various means as is known in the art.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A mobile communications device comprising:
   a) a receiver configured to receive a broadcast signal from a wireless broadcast network, the broadcast signal including an overhead portion that includes a first part related to contents of a wide-area portion of the broadcast signal and a second part related to contents of a local-area portion of the broadcast signal;
   b) a processor configured to detect a first failure, if any, in the wide-area portion independent of detecting a second failure, if any, in the local-area portion; and
   c) the processor further configured to control the receiver to reacquire the broadcast signal when either, or both, the first or second failures are detected.

2. The mobile communications device of claim 1, wherein the processor is further configured to decode the overhead portion when reacquiring the broadcast signal.

3. The mobile communications device of claim 1, wherein the overhead portion includes at least one pilot signal used for timing synchronization.

4. The mobile communications device of claim 1, wherein: the processor is further configured to identify if one or more errors occur when decoding the wide-area portion in order to detect the first failure.

5. The mobile communications device of claim 4, wherein the processor is further configured to determine if the one or more errors exceed a predetermined threshold.

6. The mobile communications device of claim 5, wherein the predetermined threshold is based on how the wide-area portion is encoded.

7. The mobile communications device of claim 1, wherein: the processor is further configured to identify if one or more errors occur when decoding the local-area portion in order to detect the second failure.

8. The mobile communications device of claim 7, wherein the processor is further configured to determine if the one or more errors exceed a predetermined threshold.

9. The mobile communications device of claim 8, wherein the predetermined threshold is based on how the wide-area portion is encoded.

10. The mobile communications device of claim 1, wherein the wide-area portion includes a first plurality of channels and the local-area portion includes a second plurality of channels.

11. The mobile communications device of claim 10, wherein: the processor is further configured to determine a failure of each of the first plurality of channels independent of one another.

12. The mobile communications device of claim 10, wherein: the processor is further configured to determine a failure of each of the second plurality of channels independent of one another.

13. The mobile communications device of claim 1, wherein the processor is further configured to control the receiver to reacquire the broadcast signal, independent of the first and second failures, based on a deterministic trigger event.

14. The mobile communications device of claim 13, wherein the deterministic trigger event is related to the mobile communications device awakening from an idle mode.

15. The mobile communications device of claim 13, wherein the deterministic trigger event is related to a user selecting content within either the wide-area portion or the local-area portion.

16. The mobile communications device of claim 13, wherein the deterministic event trigger is related to the mobile communications device being operated in a test mode.

17. A mobile communications device, comprising:
   a) a receiver configured to receive a broadcast signal from a wireless broadcast network, the broadcast signal including an overhead portion and a data portion, wherein the overhead portion includes a first part related to contents of a wide-area portion of the broadcast signal and a second part related to contents of a local-area portion of the broadcast signal; and
   b) a processor configured to:
   c) detect a failure, if any, in receiving the broadcast signal;
   d) determine a part of the overhead portion to reacquire based on the failure; and
   e) control the receiver to reacquire the part of the overhead portion of the broadcast signal.

18. The mobile communications device of claim 17, wherein the part of the overhead portion includes substantially all of the overhead portion.

19. The mobile communications device of claim 17, wherein the processor is further configured to determine if the failure is related to the overhead portion or the data portion.

20. The mobile communications device of claim 19, wherein if the failure is related to the overhead portion, then the part of the overhead portion is substantially all of the overhead portion.

21. The mobile communications device of claim 19, wherein if the failure is related to the data portion, then the part of the overhead portion is a section related to contents of the data portion.

22. The mobile communications device of claim 17, wherein the data portion comprises the wide-area portion and the local-area portion.

23. The mobile communications device of claim 22, wherein if the failure is related to the wide-area portion, then the part of the overhead portion is the first part related to contents of the wide-area portion.

24. The mobile communications device of claim 22, wherein if the failure is related to the local-area portion, then the part of the overhead portion is the second part related to contents of the local-area portion.

25. The mobile communications device of claim 17, wherein the overhead portion includes a pilot signal and if the failure is related to detecting the pilot signal, then the part of the overhead portion is a section related to the pilot signal.

26. A method of reacquiring a broadcast signal of a wireless broadcast network, comprising:
   a) receiving the broadcast signal having an overhead portion that includes a first part related to contents of a wide-area portion of the broadcast signal and a second part related to contents of a local-area portion of the broadcast signal;

b) detecting a first failure, if any, in the wide-area portion independent of detecting a second failure, if any, in the local-area portion; and c) reacquiring the broadcast signal when either the first or second failures are detected.

27. The method of claim 26, wherein reacquiring the broadcast signal further includes:
detecting and decoding at least a portion of the overhead information included in the broadcast signal.

28. The method of claim 26, wherein the wide-area portion includes a plurality of first channels and the local-area portion includes a plurality of second channels.

29. The method of claim 28, wherein detecting the first failure further includes:
detecting, for each of the first channels, whether a respective error occurred when decoding each channel.

30. The method of claim 29, wherein the respective error relates to one or more physical layer packets being erroneously decoded.

31. The method of claim 28, wherein detecting the second failure further includes:
detecting, for each of the second channels, whether a respective error occurred when decoding each channel.

32. The method of claim 31, wherein the respective error relates to one or more physical layer packets being erroneously decoded.

33. A method of reacquiring a broadcast signal of a wireless broadcast network, comprising:
a) receiving the broadcast signal having an overhead portion and a data portion, wherein the overhead portion includes a first part related to contents of a wide-area portion of the broadcast signal and a second part related to contents of a local-area portion of the broadcast signal;
b) detecting a failure, if any, in receiving the broadcast signal;
c) determining, based on the failure, a part of the overhead portion to reacquire; and
d) reacquiring the part of the overhead portion.

34. The method of claim 33, wherein if the failure is related to the overhead portion, then the part of the overhead portion is substantially all of the overhead portion.

35. The method of claim 33, wherein if the failure is related to the data portion, then the part of the overhead portion is a section related to contents of the data portion.

36. The method of claim 33, wherein the data portion comprises the wide-area portion and the local-area portion.

37. The method of claim 36 wherein if the failure is related to the wide-area portion, then the part of the overhead portion is the first part related to contents of the wide-area portion.

38. The method of claim 36, wherein if the failure is related to the local-area portion, then the part of the overhead portion is the second part related to contents of the local-area portion.

39. A mobile communications device having a receiver configured to receive a broadcast signal from a wireless broadcast network, the broadcast signal including an overhead portion that includes a first part related to contents of a wide-area portion of the broadcast signal and a second part related to contents of a local-area portion of the broadcast signal, the device comprising:
means for detecting a first failure, if any, in the wide-area portion independent of detecting a second failure, if any, in the local-area portion; and
means for controlling the receiver to reacquire the broadcast signal when either, or both, the first or second failures are detected.

40. A non-transitory computer-readable memory encoded with a computer program for reacquiring a broadcast signal of a wireless broadcast network, which upon execution cause one or more processors to:
a) receive the broadcast signal having an overhead portion including a first part related to contents of a wide-area portion of the broadcast signal and a second part related to contents of a local-area portion of the broadcast signal;
b) detect a first failure, if any, in the wide-area portion independent of detecting a second failure, if any, in the local-area portion; and
c) reacquire the broadcast signal when either the first or second failures are detected.

41. The mobile communications device of claim 39, wherein the means for controlling the receiver to reacquire the broadcast signal is further configured to decode the overhead portion when reacquiring the broadcast signal.

42. The mobile communications device of claim 39, wherein the overhead portion includes at least one pilot signal used for timing synchronization.

43. The mobile communications device of claim 39, wherein the means for detecting the first failure is further configured to identify if one or more errors occur when decoding the wide-area portion in order to detect the first failure.

44. The mobile communications device of claim 43, wherein the means for detecting the first failure is further configured to determine if the one or more errors exceed a predetermined threshold.

45. The mobile communications device of claim 44, wherein the predetermined threshold is based on how the wide-area portion is encoded.

46. The mobile communications device of claim 39, wherein the means for detecting the first failure in the wide-area portion independent of detecting the second failure in the local-area portion is further configured to identify if one or more errors occur when decoding the local-area portion in order to detect the second failure.

47. The mobile communications device of claim 46, wherein the means for detecting the first failure in the wide-area portion independent of detecting the second failure in the local-area portion is further configured to determine if the one or more errors exceed a predetermined threshold.

48. The mobile communications device of claim 47, wherein the predetermined threshold is based on how the wide-area portion is encoded.

49. The mobile communications device of claim 40, wherein the wide-area portion includes a first plurality of channels and the local-area portion includes a second plurality of channels.

50. The mobile communications device of claim 49, wherein the means for detecting the first failure in the wide-area portion independent of detecting the second failure in the local-area portion is further configured to determine a failure of each of the first plurality of channels independent of one another.

51. The mobile communications device of claim 49, wherein the means for detecting the first failure in the wide-area portion independent of detecting the second failure is further configured to determine a failure of each of the second plurality of channels independent of one another.

52. The mobile communications device of claim 39, wherein the means for controlling the receiver to reacquire the broadcast signal is further configured to control the receiver to reacquire the broadcast signal, independent of the first and second failures, based on a deterministic trigger event.

53. The mobile communications device of claim 52, wherein the deterministic trigger event is related to the mobile communications device awakening from an idle mode.

54. The mobile communications device of claim 52, wherein the deterministic trigger event is related to a user selecting content within either the wide-area portion or the local-area portion.

55. The mobile communications device of claim 52, wherein the deterministic event trigger is related to the mobile communications device being operated in a test mode.

56. The non-transitory computer-readable memory of claim 40 encoded with the computer program, which upon execution further cause the one or more processors to:
decode the overhead portion when reacquiring the broadcast signal.

57. The non-transitory computer-readable memory of claim 40, wherein the overhead portion includes at least one pilot signal used for timing synchronization.

58. The non-transitory computer-readable memory of claim 40 encoded with the computer program, which upon execution further cause the one or more processors to:
identify if one or more errors occur when decoding the wide-area portion in order to detect the first failure.

59. The non-transitory computer-readable memory of claim 58 encoded with the computer program, which upon execution further cause the one or more processors to:
determine if the one or more errors exceed a predetermined threshold.

60. The non-transitory computer-readable memory of claim 59, wherein the predetermined threshold is based on how the wide-area portion is encoded.

61. The non-transitory computer-readable memory of claim 40 encoded with the computer program, which upon execution further cause the one or more processors to:
identify if one or more errors occur when decoding the local-area portion in order to detect the second failure.

62. The non-transitory computer-readable memory of claim 61 encoded with the computer program, which upon execution further cause the one or more processors to:
determine if the one or more errors exceed a predetermined threshold.

63. The non-transitory computer-readable memory of claim 62, wherein the predetermined threshold is based on how the wide-area portion is encoded.

64. The non-transitory computer-readable memory of claim 40, wherein the wide-area portion includes a first plurality of channels and the local-area portion includes a second plurality of channels.

65. The non-transitory computer-readable memory of claim 64 encoded with the computer program, which upon execution further cause the one or more processors to:
determine a failure of each of the first plurality of channels independent of one another.

66. The non-transitory computer-readable memory of claim 64 encoded with the computer program, which upon execution further cause the one or more processors to:
determine a failure of each of the second plurality of channels independent of one another.

67. The non-transitory computer-readable memory of claim 40 encoded with the computer program, which upon execution further cause the one or more processors to:
control the receiver to reacquire the broadcast signal, independent of the first and second failures, based on a deterministic trigger event.

68. The non-transitory computer-readable memory of claim 67, wherein the deterministic trigger event is related to the mobile communications device awakening from an idle mode.

69. The non-transitory computer-readable memory of claim 67, wherein the deterministic trigger event is related to a user selecting content within either the wide-area portion or the local-area portion.

70. The non-transitory computer-readable memory of claim 67, wherein the deterministic event trigger is related to the mobile communications device being operated in a test mode.

71. An apparatus for reacquiring a broadcast signal of a wireless broadcast network, the apparatus comprising:
means for receiving the broadcast signal having an overhead portion and a data portion, wherein the overhead portion includes a first part related to contents of a wide-area portion of the broadcast signal and a second part related to contents of a local-area portion of the broadcast signal;
means for detecting a failure, if any, in receiving the broadcast signal;
means for determining, based on the failure, a part of the overhead portion to reacquire; and
means for reacquiring the part of the overhead portion.

72. The apparatus of claim 71, wherein if the failure is related to the overhead portion, then the part of the overhead portion is substantially all of the overhead portion.

73. The apparatus of claim 71, wherein if the failure is related to the data portion, then the part of the overhead portion is a section related to contents of the data portion.

74. The apparatus of claim 71, wherein the data portion comprises the wide-area portion and the local-area portion.

75. The apparatus of claim 74 wherein if the failure is related to the wide-area portion, then the part of the overhead portion is the first part related to contents of the wide-area portion.

76. The apparatus of claim 74, wherein if the failure is related to the local-area portion, then the part of the overhead portion is the second part related to contents of the local-area portion.

77. A non-transitory computer-readable memory encoded with a computer program for reacquiring a broadcast signal of a wireless broadcast network, which upon execution cause one or more processors to:
receive the broadcast signal having an overhead portion and a data portion, wherein the overhead portion includes a first part related to contents of a wide-area portion of the broadcast signal and a second part related to contents of a local-area portion of the broadcast signal;
detect a failure, if any, in receiving the broadcast signal;
determine, based on the failure, a part of the overhead portion to reacquire; and
reacquire the part of the overhead portion.

78. The non-transitory computer-readable memory of claim 77, wherein if the failure is related to the overhead portion, then the part of the overhead portion is substantially all of the overhead portion.

79. The non-transitory computer-readable memory of claim 77, wherein if the failure is related to the data portion, then the part of the overhead portion is a section related to contents of the data portion.

80. The non-transitory computer-readable memory of claim 77, wherein the data portion comprises the wide-area portion and the local-area portion.

81. The non-transitory computer-readable memory of claim 80, wherein if the failure is related to the local-area portion, then the part of the overhead portion is the second part related to contents of the local-area portion.

82. The non-transitory computer-readable memory of claim 80 wherein if the failure is related to the wide-area portion, then the part of the overhead portion is the second part related to contents of the wide-area portion.

* * * * *